UNITED STATES PATENT OFFICE.

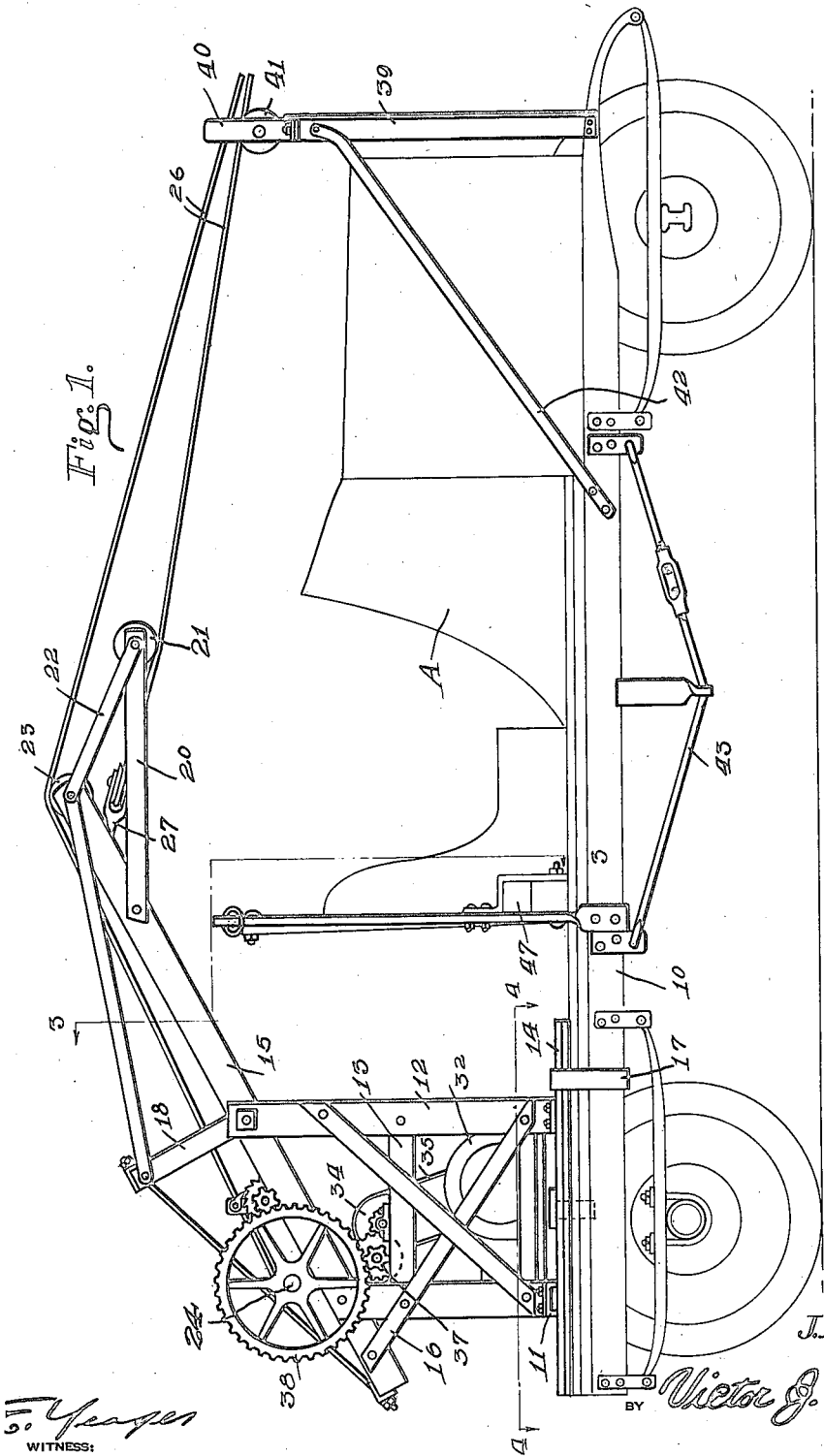

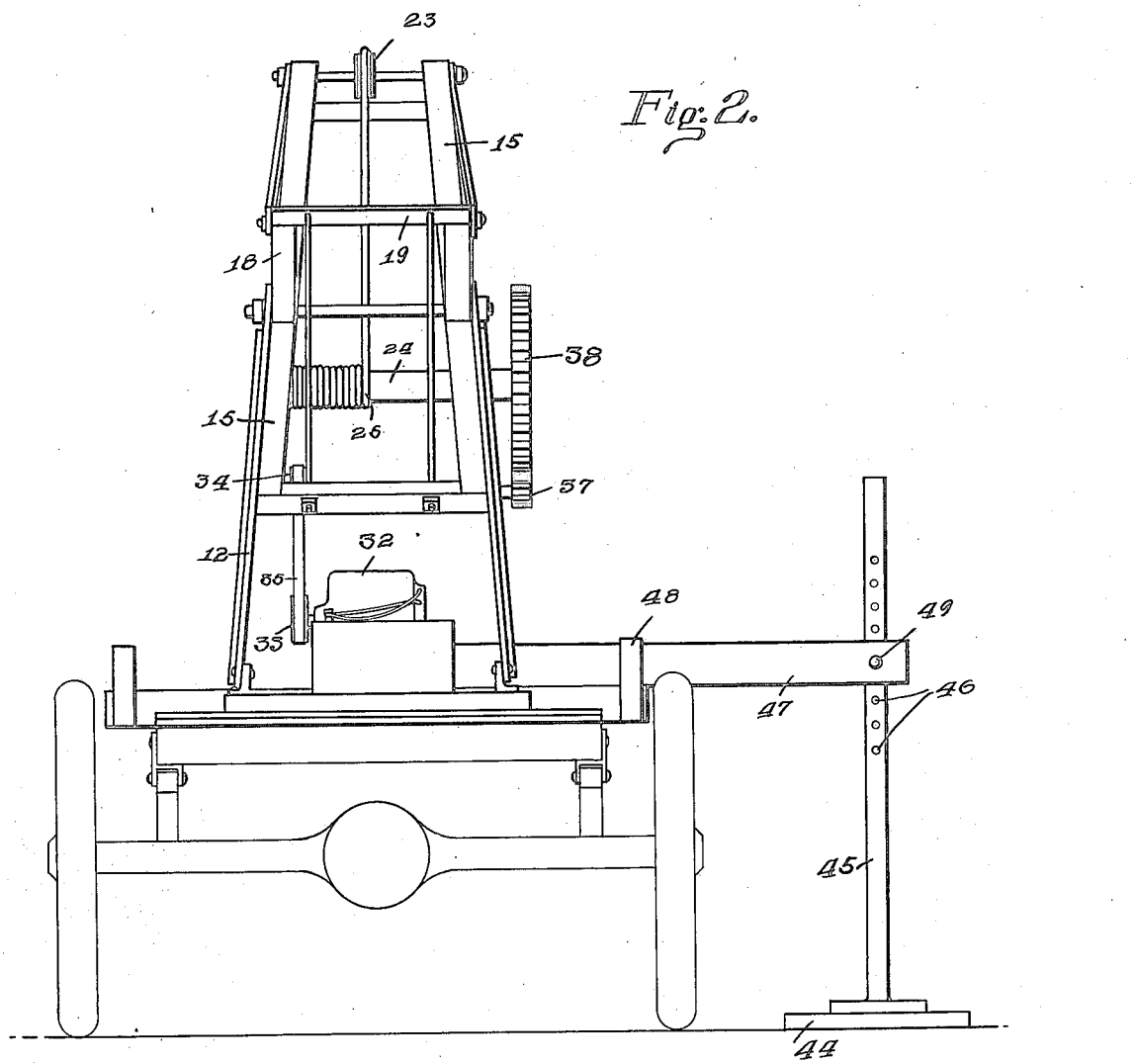

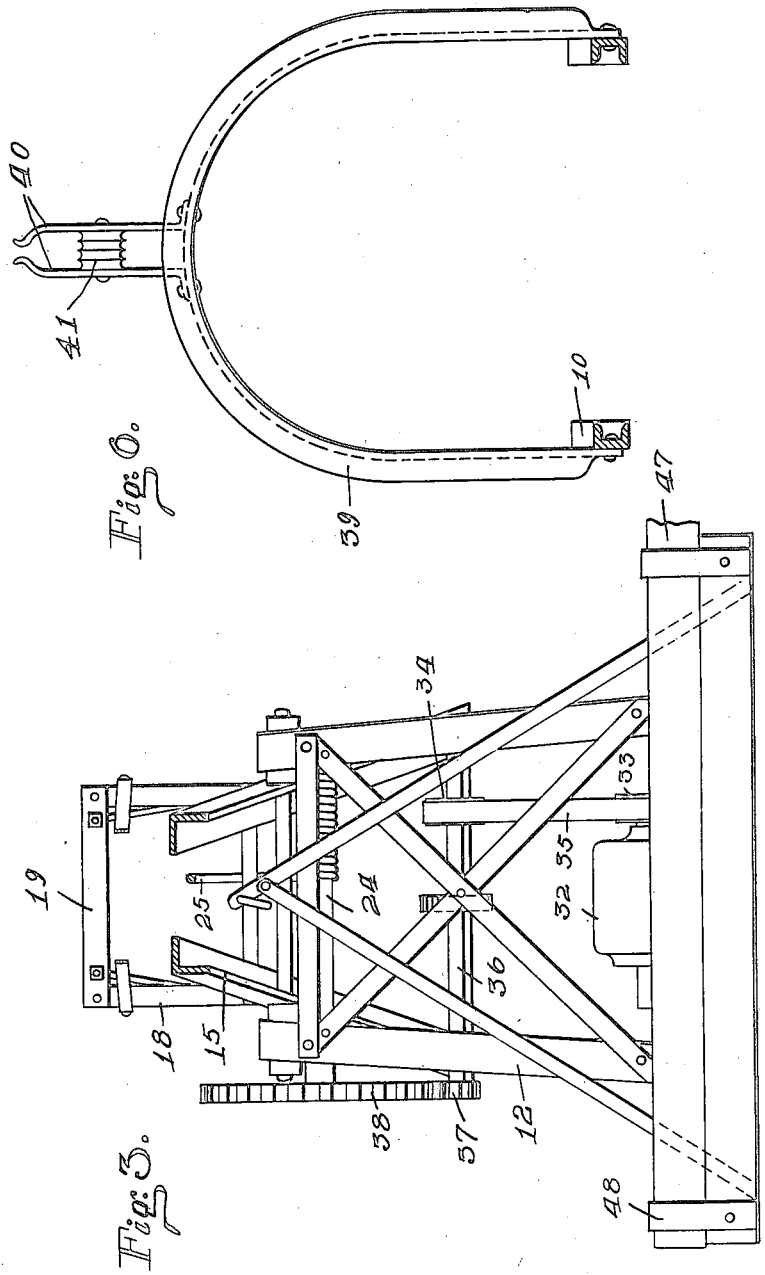

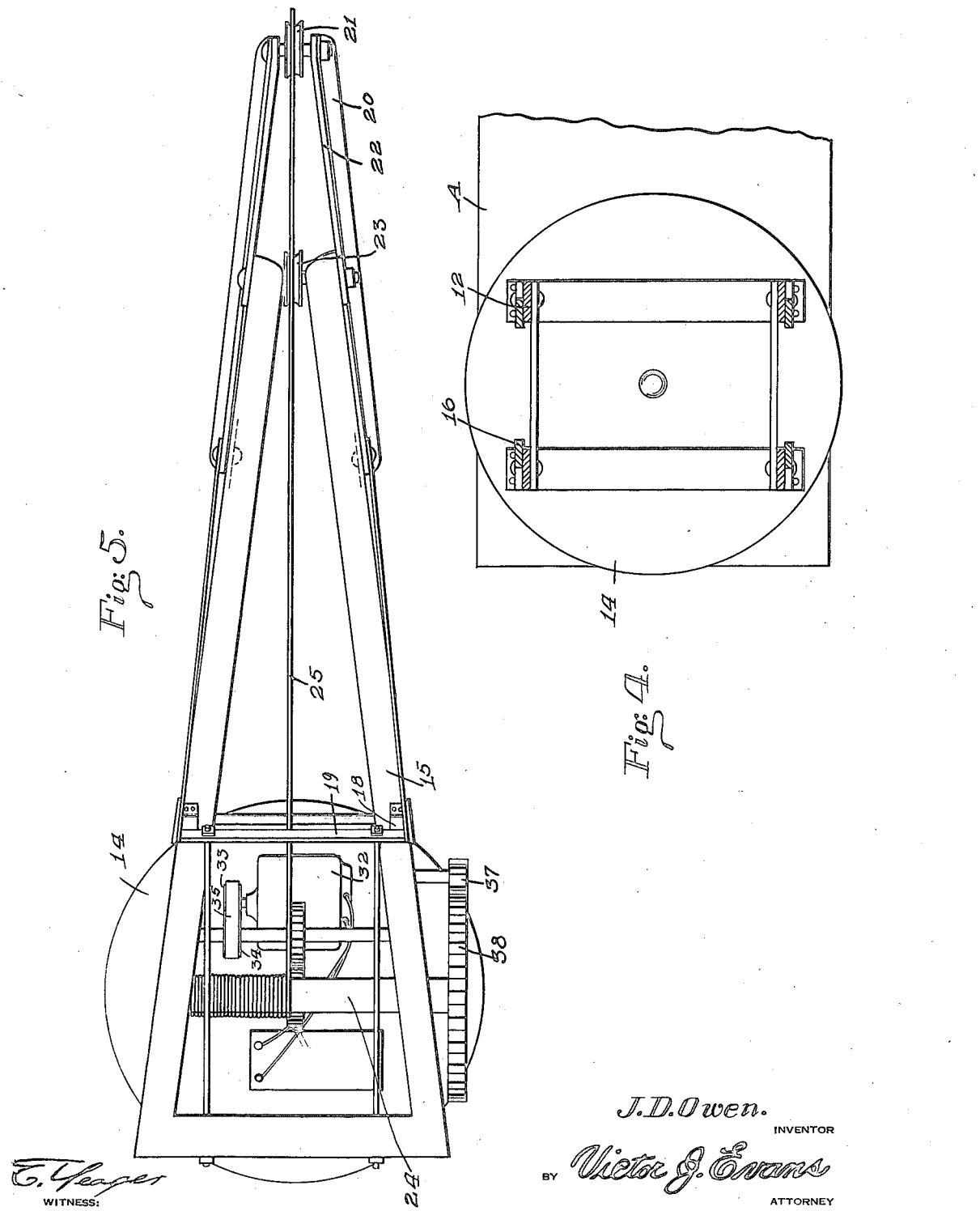

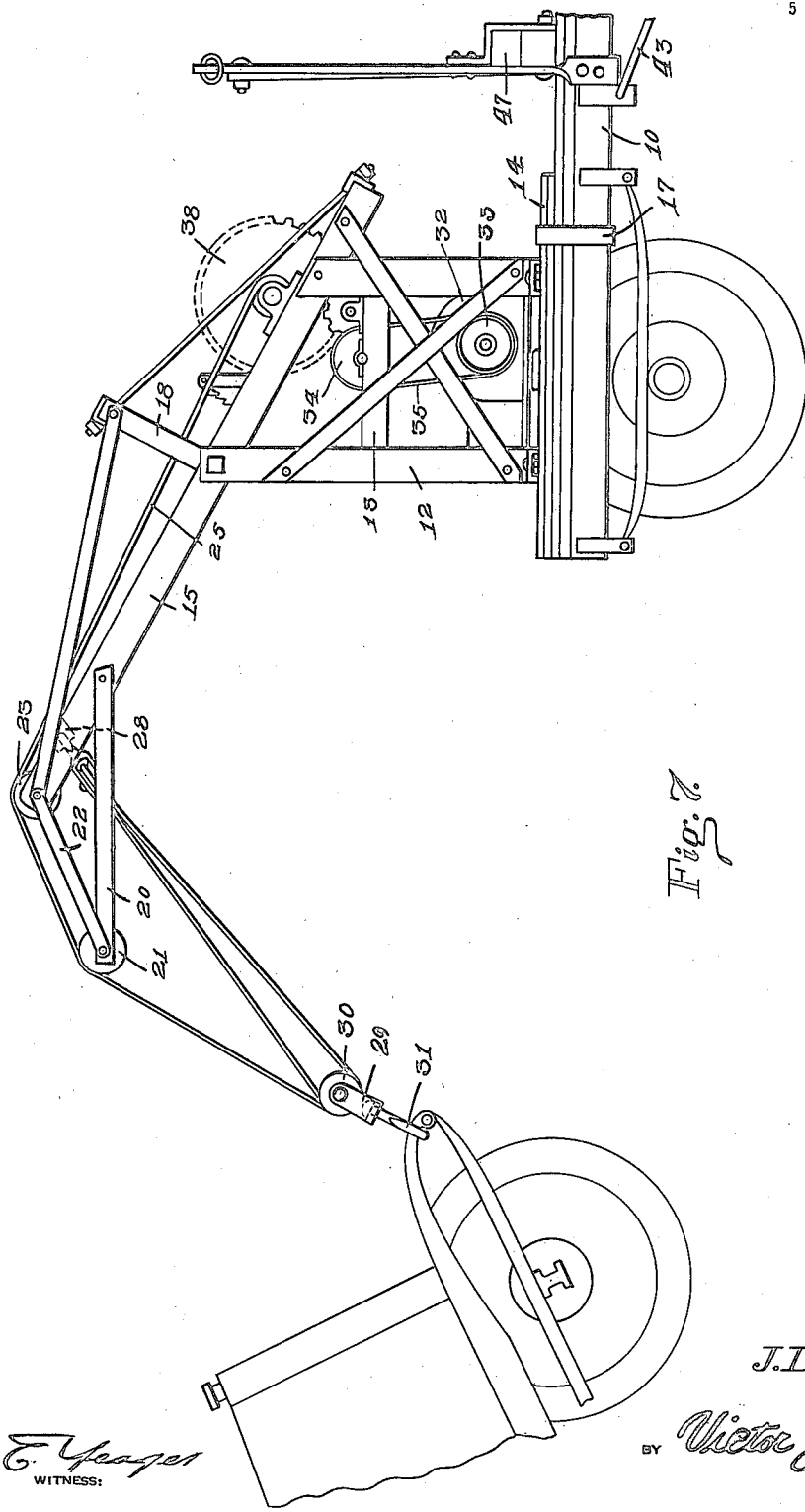

JOHN D. OWEN, OF HARRIMAN, TENNESSEE.

VEHICLE-HANDLING APPARATUS.

1,425,045.     Specification of Letters Patent.     Patented Aug. 8, 1922.

Application filed September 13, 1920. Serial No. 409,869.

*To all whom it may concern:*

Be it known that I, JOHN D. OWEN, a citizen of the United States, residing at Harriman, in the county of Roane and State of Tennessee, have invented new and useful Improvements in Vehicle-Handling Apparatus, of which the following is a specification.

This invention comprehends the provision of a vehicle handling apparatus, primarily designed for lifting, pulling or otherwise moving wrecked automobiles, or similar machines which are not capable of movement under their own motor power.

The chief characteristic of the present invention, resides in the provision of an apparatus of the above mentioned character, which is mounted upon a service car or other means of conveyance, and designed to elevate either end of the machine to be moved, and if necessary subsequently tow the machine to a repair shop in quick order.

In carrying out the invention I also provide an adjustable anchor to steady the machine upon which the apparatus is mounted while the latter is in operation.

More specifically stated, the invention embodies amongst other features a boom carried by a turn table or the like to permit the boom to be shifted to the desired position, depending of course upon the location of the machine to be elevated or moved, and a hoisting cable or block which is operated through the instrumentality of a motor.

The nature and advantages of the invention will be better understood when the following detail description is read in connection with the accompanying drawings the invention residing in the construction, combination and arrangement of parts as claimed.

In the drawings forming part of this application like numerals of reference indicate similar parts in the several views and wherein:

Figure 1 is an enlarged side elevation of the apparatus showing the same mounted upon a service car or the like.

Figure 2 is an enlarged rear elevation.

Figure 3 is a sectional view taken on line 3—3 of Figure 1 looking in the direction of the arrow.

Figure 4 is a horizontal sectional view taken on line 4—4 of Figure 1.

Figure 5 is a top plan view of the apparatus removed from the service car.

Figure 6 is a front elevation.

Figure 7 is a fragmentary view showing the manner of using the apparatus, drawing the machine out of a ditch or the like.

Referring to the drawings in detail, A indicates generally the motor operated vehicle upon which the apparatus forming the subject matter of my invention is mounted. It is of course to be understood that the apparatus can be associated to any other type of vehicle or means of conveyance without departing from the spirit of the invention, but herein is shown used in connection with a motor operated vehicle, as such are generally used as service cars by large garages and repair shops for towing or hauling wrecked automobiles or the like. 10 indicates the chassis of the vehicle and upon which the apparatus is mounted.

The apparatus includes a frame which consists of a base 11 and a plurality of standards or uprights 12 which rise from the base and which are connected together by a plurality of transversely disposed reinforcing elements 13. A turn table or the like 14 is mounted upon the base 11 and carried by the uprights 12 is a boom 15 which is susceptible of being adjusted wreck end forwardly of the vehicle A, rearwardly thereof, or to any desired angular position with relation thereto, this of course depending upon the position or location of the wrecked automobile which is to be handled. The boom is placed at one end by a diagonally disposed bracing element 16 which is terminally secured to the boom and also to one of the uprights 12. Depending from the base 11 are hook like elements 17 utilized to secure the apparatus upon the frame or chassis of the vehicle A, these hooks embracing the sides of the frame as clearly illustrated in the drawings. The members 15 of the boom are convergently disposed as shown, and rising from these members are short uprights or standards 18 connected by a cross piece 19, while terminally connected to the standards or uprights 18 are reinforcing elements which extend forwardly and are convergently disposed for association with the corresponding extremities of the members 15 of the boom. Projecting beyond the forward end of the members 15 are links or arms 20 which are secured to the members 15 of the boom, these members supporting between their corresponding ends a pulley 21. Projecting from the forward ends of the members 15 of the boom are links 22 which are terminally connected to the arms 20. Journaled between the forward extremities of the members 15 of the boom is a pulley 23. Journaled between the members 15 of the boom is a shaft 24 about which is wound a cable 25 which is trained over the pulley 23 and looped as at 26, the free end of this cable being trained under the pulley 21 and carrying a hook like element 27 which engages a staple or the like 28 carried by the boom. The loop 26 of the cable has associated therewith a block 29 of the usual construction including a plurality of sheaves 30 over which the cable is trained, and a hook 31.

Mounted upon the turntable is a motor 32, which may be of any suitable character, but preferably an electric motor which is used to rotate the shaft 24. Trained over the belt wheel 33 of the motor and a pulley 34 carried by the shaft 24 is a belt 35. Carried by the shaft 36 upon which the pulley 34 is mounted, is a small gear 37 which meshes with a large gear 38 carried by the shaft 24, so that rotation is imparted to the shaft 24 through the instrumentality of the motor 32.

Mounted upon the chassis of the vehicle A in advance of the radiator is a yoke 39 from the top of which rises spaced parallel members 40. Journaled between these members is a pulley 41 over which the runs of the loop 26 of the cable are trained. The hook 39 is braced at its opposite sides by elements 42 which are terminally secured to the sides of the yoke and also to the side members of the chassis of the vehicle A. The chassis is also reinforced by a truce rod 43.

With a view of steadying the vehicle A when the apparatus is in use, I provide a brace including a foot 44 and a standard 45 rising from the foot and provided with a plurality of openings 46. The standard 45 is adjustably associated with a beam 47 which is horizontally disposed upon the base of the apparatus and slidable through guides 48. The beam 47 is provided with an opening with which any one of the openings 46 may register to receive a pin or locking element 49 for holding the brace fixed relative to the beam. Manifestly by reason of this construction, the brace can be adjusted to accommodate itself to irregular ground or surfaces so as to effectively engage the ground to steady the machine or vehicle A while the apparatus is in use. Subsequent to the use of the anchor, the beam 47 can be slid through the guides 48 so as not to project beyond the sides of the vehicle A, and the anchor in its entirety easily arranged upon the machine at the rear of the driver's seat.

In practice, the parts are normally arranged in the manner shown in Figure 1, the hook 31 of the block engages the parallel members rising from the yoke 39. When the vehicle A reaches its destination, the hook 31 of the block 29 is disengaged from the said yoke and moved in advance of the vehicle A and engaged in an appropriate part of the machine to be extracted from a ditch or the like as shown in Figure 7. When the block 29 is thus associated with the machine to be moved, the anchor 44 is adjusted with respect to the ground to effectively engage the latter, after which the motor 32 is operated to rotate the shaft 24. As the cable 25 winds about the shaft 24 a pull is exerted upon the machine to be extracted, thus removing the latter out of the ditch. Subsequent to being removed out of the ditch, the machine may be connected in the usual well known manner by means of a tow chain to the rear of the vehicle A and towed to the garage or repair shop. However, if the machine to be moved is so damaged as to prohibit its running on all four wheels thereby necessitating jacking or elevating the rear end of the car, it is only necessary to turn the boom together with the turn table to the desired position, it of course being necessary to remove the hoisting cable and block entirely away from the yoke 39, and after the boom has been shifted with respect to the machine. Irrespective of how badly the machine may be damaged, or whether it is merely stalled on account of motor trouble, the machine to be hauled, towed or otherwise moved can be conveniently and quickly handled by means of my invention, and taken to the garage or repair shop in very quick order.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

1. The combination with a motor operated vehicle, of a vehicle handling apparatus comprising a base adapted to be arranged upon the frame of said vehicle, clamps associated with the base and designed to embrace the sides of said frame, a supporting structure mounted on the base and including a boom, a turn table on said base and supporting said boom, said boom being arranged at the rear of the vehicle, a substantially U-shaped member arranged in advance of the radiator and terminally clamped to the frame of the vehicle, bracing elements connecting the sides of said member with the frame, guide pulleys journaled on said member, a rotatable shaft, means for rotating the shaft, a hoisting cable adapted to be wound upon and unwound from the shaft, a pulley journaled upon one end of the boom and over which said cable is trained, arms projecting forwardly from said boom, and a pulley journaled on said arms serving as a guide for said cable.

2. The combination with a motor operated vehicle, of a vehicle handling apparatus comprising a base arranged upon the frame of the vehicle at the rear end thereof, means associated with the base for clamping the latter to the sides of said frame, a turn table on said base, a supporting frame-like structure mounted on the base, a boom carried by said structure, a rotatable shaft, means for rotating said shaft, a hoisting cable adapted to be wound about and unwound from said shaft, a guide pulley journaled on one end of the boom over which said cable is trained, arms projecting forwardly from said boom, a second guide pulley supported by said arms, uprights supported by the frame of the vehicle, angularly-shaped members secured to said uprights, a beam slidable through said angularly-shaped members and arranged horizontally of the frame, a base including a base adapted to repose upon the ground, and an upright rising from the base and adjustably associated with said beam, a substantially U-shaped member terminally clamped to the frame of the vehicle and arranged immediately in advance of the radiator, spaced arms rising from said member, and pulleys journaled between said arms, and over which said cable is trained for the purpose specified.

In testimony whereof I affix my signature.

JOHN D. OWEN.